United States Patent
Armstrong

(10) Patent No.: US 12,220,641 B2
(45) Date of Patent: Feb. 11, 2025

(54) CONTENT GENERATION SYSTEM AND METHOD

(71) Applicant: Sony Interactive Entertainment Inc., Tokyo (JP)

(72) Inventor: Calum Armstrong, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 144 days.

(21) Appl. No.: 17/728,173

(22) Filed: Apr. 25, 2022

(65) Prior Publication Data

US 2022/0339543 A1 Oct. 27, 2022

(30) Foreign Application Priority Data

Apr. 27, 2021 (GB) ...................... 2105968

(51) Int. Cl.
*A63F 13/67* (2014.01)
*G06F 3/01* (2006.01)

(52) U.S. Cl.
CPC .............. *A63F 13/67* (2014.09); *G06F 3/011* (2013.01)

(58) Field of Classification Search
CPC .......... A63F 13/67; A63F 13/52; A63F 13/69; G06F 3/011; G06T 19/00; G06T 15/00; G06T 19/006
See application file for complete search history.

(56) References Cited

U.S. PATENT DOCUMENTS 6,453,253 B1 9/2002 Tsugio
9,552,653 B2* 1/2017 Tsurumi .................. G06T 11/00
2005/0171754 A1 8/2005 Santodomingo
2007/0024644 A1* 2/2007 Bailey ..................... G06F 3/011
  345/633
2011/0243340 A1 10/2011 Kumagai
2015/0052458 A1* 2/2015 Rothenberger ......... G06F 9/541
  715/757
2015/0331813 A1* 11/2015 Perrin ................ H04N 21/4126
  345/522

(Continued)

FOREIGN PATENT DOCUMENTS

WO 2014160419 A1 10/2014
WO 2020190565 A1 9/2020

OTHER PUBLICATIONS

Combined Search and Examination Report for corresponding GB Application No. GB2105968.8, 8 pages, dated Oct. 15, 2021.

(Continued)

*Primary Examiner* — Omkar A Deodhar
*Assistant Examiner* — Shauna-Kay Hall
(74) *Attorney, Agent, or Firm* — Kilpatrick Townsend & Stockton LLP

(57) ABSTRACT

A system for generating interactive content for a user includes an environment identification unit operable to identify a virtual environment for interaction by a user, an element arrangement unit operable to generate an arrangement of a plurality of elements within the environment in dependence upon one or more parameters, a content modification unit operable to modify the virtual environment so as to include the plurality of elements in the generated arrangement, and a content rendering unit operable to render one or more images of the modified virtual environment.

13 Claims, 5 Drawing Sheets

(56) References Cited

U.S. PATENT DOCUMENTS

| | | | | |
|---|---|---|---|---|
| 2016/0082354 A1* | 3/2016 | Wakeford | ............ | A63F 13/358 |
| | | | | 463/29 |
| 2017/0011554 A1* | 1/2017 | Burba | .................... | G06T 15/20 |
| 2017/0345215 A1* | 11/2017 | Khedkar | ................ | G06V 40/19 |
| 2018/0227687 A1 | 8/2018 | Thomson | | |
| 2020/0380788 A1* | 12/2020 | Hutten | ................. | G06T 19/006 |
| 2021/0086083 A1* | 3/2021 | Aghdaie | ................ | A63F 13/67 |

OTHER PUBLICATIONS

C. Lopez, et al., "Deep reinforcement learning for procedural content generation of 3D virtual environments," ASME Journal of Computing and Information Science in Engineering, vol. 20, 9 pages, Oct. 1, 2020 (See Non Pat Lit #1).

Extended European Search Report for corresponding EP Application No. 22165014.6, 7 pages, dated Sep. 13, 2022.

* cited by examiner

CONTENT GENERATION SYSTEM AND METHOD

BACKGROUND OF THE INVENTION

Field of the Invention

This disclosure relates to a content generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Video games have proven to be an increasingly popular pastime in recent years, fuelled in part by the increase in available content and the release of new hardware that enables more immersive and varied experiences. For example, newer games consoles have enabled games to have improved graphics while head-mountable displays (HMDs) have allowed users to access virtual reality experiences at home. Along with this increase in popularity of playing games, there has been a significant increase in the creation of content to be viewed—for example, it has become increasingly common to share and view footage of games being played.

While the increase in content being viewed can be seen as positive in that it can increase community engagement with content, one drawback is that a user may lose some enjoyment of their own gaming experience. For instance, the viewed content may contain information about a secret or the solution to a puzzle (referred to as spoilers) or simply lose enjoyment due to already being aware of the events or environments when playing a game. This may be of particular significance in virtual reality experiences, in which a sense of immersion may be negatively impacted by having viewed the same content elsewhere.

One way in which such problems have been addressed in earlier arrangements is the use of procedural generation of environments. Such methods generate random arrangements of a predefined set of assets to enable the creation of a large number of environments without human intervention. In some cases, a predefined set of rules may be used to constrain the generation so that the output is not entirely random—for instance, a condition such as 'object X cannot be placed next to object Y' may be used to guide the generation. This can enable the generation of an environment that may be suitable for exploration by a player in a more randomised fashion, so that different players may have different experiences of the same game.

However, such randomness and variation between experiences can lead to some players having an increased challenge or an otherwise significantly different experience to other players. This can be particularly problematic for games with a competitive element in which players wish to compare their performance (such as games in which speedruns are encouraged). Such differences may be further emphasised in virtual reality experiences in which user mobility and the like may cause small variations to have a big impact on the player's ability to complete a mission or overcome an obstacle—the more physical interaction methods often associated with VR may magnify these differences relative to a traditional controller-based game.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
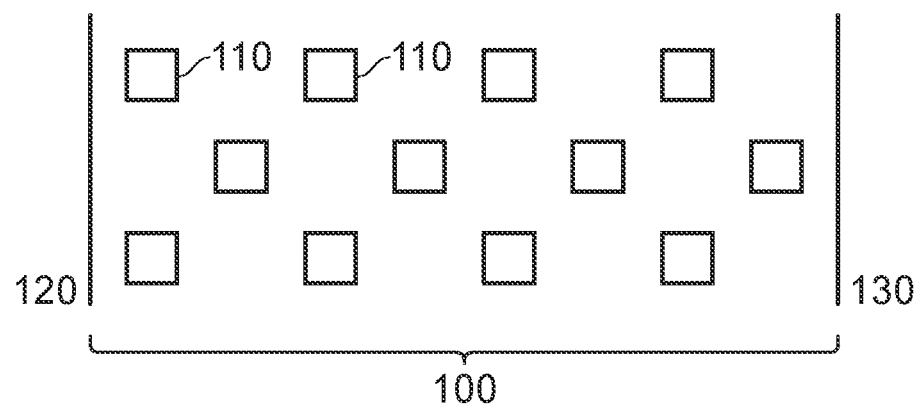
FIGS. 1*a*, 1*b*, and 1*c* schematically illustrate exemplary arrangements of elements.

Referring now to the drawings, wherein like reference numerals designate identical or corresponding parts throughout the several views, embodiments of the present disclosure are described.

Embodiments of the present disclosure are directed towards the generation of an arrangement of a plurality of elements within a virtual environment; this may be performed as a part of the virtual environment generation process, or may be performed separately so as to populate an existing virtual environment. Here a virtual environment is considered to be an area which is able to be navigated by a user (such as a virtual room), while the elements are considered to be component parts of the virtual environment that the user can optionally interact with (such as platforms, walls, non-player characters, or barriers). Further details of such a generation are discussed below with reference to the Figures.

FIG. 1*a* illustrates an exemplary arrangement 100 of elements 110 that may be located within a virtual environment; the elements 110 may be floating platforms or the like, with the player being required to jump between the platforms 110 to cross from one side 120 to the other 130. The difficulty of reaching the side 130 is determined by a number of factors (external to characteristics of the player's avatar) such as relative angles between platforms 110, distances between platforms 110, size of platforms 110, and time-based factors such as platform motion or lifetime (such as a platform that falls a predetermined time after the player reaches it).

The arrangement 100 may be selected for a particular level of difficulty intended by the designer of a game—however this may prove trivial for a number of players, while being exceedingly difficult (and therefore frustrating) for others. In the case of an arrangement of platforms, the difficulty is determined as the difficulty of navigating the arrangement for a user—this can be determined from success rates of trial runs (for example, by a human or AI player), or from an analysis of the arrangement to determine tolerances for each navigation action (that is, the range of possible actions that lead to success or a measure of how precise a user has to be with their inputs to be successful). In arrangements of elements other than platforms, equivalent processing and testing may be considered to determine a measure of success and/or difficulty of the arrangement.

Figure 1B:
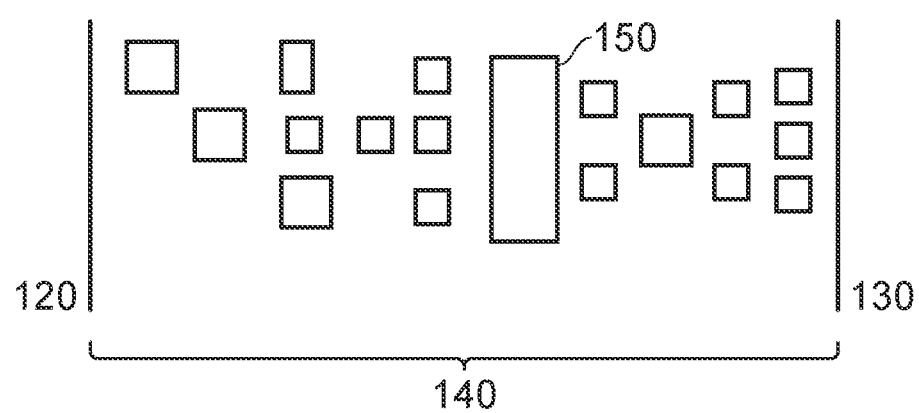

FIG. 1b schematically illustrates an alternative arrangement 140 of elements 110 in which a difficulty of navigation is reduced relative to the arrangement 100 of FIG. 1a. The difficulty is considered reduced as the platforms 110 are closer together and as such the player will be able to move between them with greater ease. In addition to this, the arrangement includes some larger elements 150 that assist the user in navigating the arrangement—although of course smaller elements may also be provided where appropriate (for instance, if provided close to other elements).

Figure 1C:
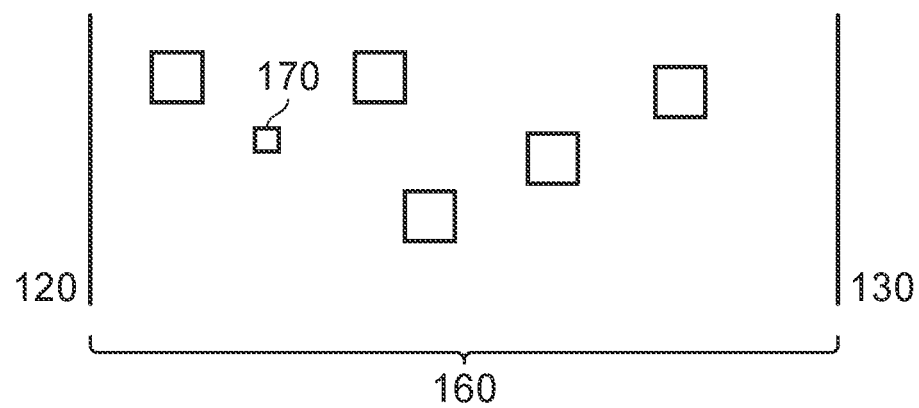

FIG. 1c schematically illustrates an alternative arrangement 160 of elements 110 in which a difficulty of navigation is increased relative to the arrangement 100 of FIG. 1a. The difficulty is considered increased as the platforms 110 are further apart, which will require more precise timing and aiming of a jump by the player to successfully navigate between the platforms 110. In addition to this, it is considered that smaller elements (such as the element 170) may also be provided that provide further difficulty for the user in navigating the arrangement. Larger elements may also be provided, although they may be less common than in arrangements associated with lower levels of difficulty.

A particular arrangement may also be regarded as being rather uninteresting in the case of repeated playthrough or visits to the location in which the arrangement is present, or if the player has already seen other players navigating the arrangement in generated video content. It is further considered that similar challenges may be used several times throughout a piece of content (such as a video game), and that generating a unique arrangement for each instance of the challenge may be time consuming.

In view of these considerations there may be a desire to enable the generation of such arrangements in a more varied and responsive manner for each player (or at least a subset of players). However, there are numerous obstacles to such a generation that may arise; examples include the generation of content with an appropriate level of difficulty or compatibility with an environment (or other objects within the environment).

As noted above, there have been previous attempts at addressing a number of these problems in existing video games. For instance, in the context of games in the rogue-like genre it is considered important to have variety due to repeated plays by a user. Such existing games generally fall into one of two categories—a first category in which pre-defined environments (such as chambers or rooms) are arranged in a random (or pseudorandom) order, or a second category in which environments are generated on-the-fly or in response to the user starting a new game (using a game seed, for instance).

One technique that has been previously used, as mentioned above, is that of procedural generation. Procedural generation is a method for automating the generation of content, usually by using a computer algorithm to randomise the layout of pre-generated content—for instance as a virtual environment generation process. Such techniques can also be used for the generation of in-game items with randomised attributes. This automation may in some cases be constrained by some predefined rules, such as 'generate a weapon of X level for a player of level Y' or 'generate an environment with X % of the surface being water', to guide the procedural generation method in a desired direction.

While such methods are useful in increasing the randomness of content and the efficiency of the content generation process, there are a number of drawbacks that are observed. For example, the content that is generated may be of limited creative value. That is to say that a virtual environment may be generated that provides little enjoyment to a user—this may be due to similarity to other environments (or at least due to a lack of sufficiently distinctive characteristics, which can render the environments perceptually similar to a player), being somewhat unbelievable (such as sharp transitions between biomes), or due to the environment being difficult to navigate during gameplay. While a number of these problems may be addressed with additional rules defined by a content designer, this can place a significant burden on the designer.

Embodiments of the present disclosure therefore utilise a different approach to those of the previously proposed methods. In these embodiments, it is considered that one or more objects may be arranged within a virtual environment using the output of a machine learning model that is trained to identify suitable arrangements of the objects within a virtual environment. This therefore differs from the approaches discussed above in that this relates to an arrangement of one or more objects within an environment, rather than the generation of an environment itself, and in that the process is self-constrained by the training of a machine learning model. Further to this, enabling a user to interact with the arranged objects in a desired manner is a key motivation of the disclosed embodiments—thereby further distinguishing the disclosed embodiments from the existing methods as described above, in which the generation of an environment at random serves a largely cosmetic purpose. A number of embodiments are also configured to take into account the physics associated with the virtual environment, which can be used to improve the object arrangement process.

Figure 2:
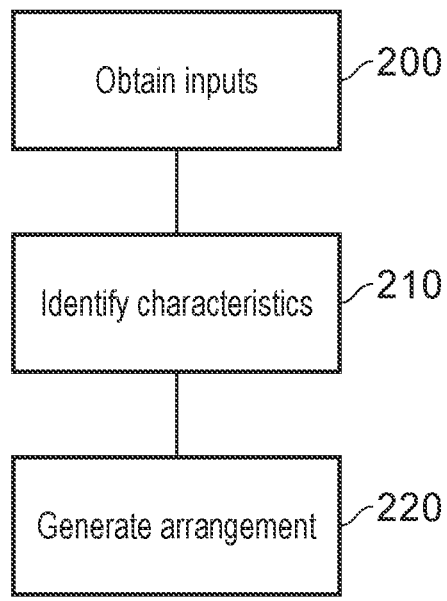
FIG. 2 schematically illustrates an arrangement generation method.

FIG. 2 schematically illustrates an example of a method according to one or more embodiments of the present disclosure. The order of the steps as shown below is entirely exemplary, and it may be modified as appropriate for a given implementation.

A step 200 comprises obtaining one or more inputs that are used to guide the generation of an arrangement of one or more objects within a virtual environment. Examples of appropriate inputs may include an intended difficulty of the game, user experience levels, and information about the game in which the environment is present.

A step 210 comprises identifying one or more characteristics of the virtual environment in which the objects are to be arranged. For example, the virtual environment may be a large room in which a number of platforms (examples of objects) are to be arranged as discussed above with respect to FIG. 1A. Exemplary characteristics may include a size of the environment, a visual style, one or more physics properties (such as a value indicating the strength of gravity in the environment), and/or one or more objectives to be achieved in the virtual environment (such as entry and exit locations). More specifically, this step may include identifying the object arrangement area (that is, the area within the virtual environment in which objects are to be arranged) and determining one or more properties of that area.

A step 220 comprises generating an arrangement of the one or move objects within the virtual environment. This arrangement may be stored in any suitable manner—in some embodiments a file storing the virtual environment may be updated to include the arranged objects, while in others information is generated that identifies a list of locations (for example, using coordinate values) for the objects (and in some cases, identifies the objects themselves) within the virtual environment. This step may comprise an iterative element, in which an initial arrangement is generated and then refined in dependence upon one or more criteria (such as ease of player traversal) to generate an output (or final) arrangement of the objects.

The step 220 is performed using a machine learning algorithm in dependence upon the information obtained in steps 200 and 210. This machine learning algorithm may take any suitable format; examples of suitable implementations are discussed below.

In some embodiments, the step 220 may also comprise a selection of the objects themselves rather than just the arrangement of objects. For instance, if tasked with generating an arrangement of platforms the step 220 may include a selection of a size, shape, and/or style of platform. This can assist further with generated distinctive arrangements of objects within the virtual environment, as similar layouts can be distinguished from one another by the differences in the platforms.

Figure 3:
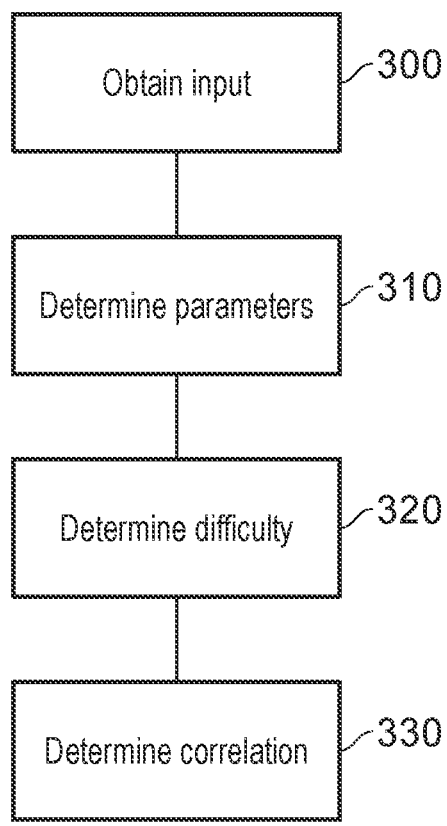
FIG. 3 schematically illustrates a training method.

FIG. 3 schematically illustrates a first method for training a machine learning model according to one or more embodiments of the present disclosure. Such a method is entirely exemplary; it is considered that in practice a number of modifications to the method may be made. It is further considered that multiple training methods may be used to train the machine learning model, for instance using different data sources or the like.

A step 300 comprises obtaining an input virtual environment in which an arrangement of objects is present. This virtual environment may be in any suitable format; for example, rather than an interactive environment (as would be shown in game) it may be preferable in some embodiments to instead provide information about the environment in the form of a map describing the environment or to directly provide information characterising the environment without any visual content. This can reduce the data processing overhead, for example by reducing the amount of texture information that is used, while maintaining the spatial information relating to the virtual environment.

The input virtual environment may be an environment that is generated by a game developer so as to include one of a number of examples of arrangements of objects within a virtual environment. Additional information characterising the virtual environment may also be obtained in this step, such as game physics, character information (such as manoeuvrability information), and visual characteristics (rather than only geometry of the virtual environment); however some, or all, of this information may instead be obtained below in step 310.

A step 310 comprises an analysis of the environment to determine one or more parameters. For instance, this step may comprise an analysis of the geometry of the environment and an arrangement of objects within the environment. Examples of parameters that may be determined include the relative positioning of objects within an arrangement, the size of the environment and/or the objects, the intended goal associated with the environment (such as a start and intended end location for a player, and/or a time limit for the user to perform a task), the area of the environment associated with the arrangement, and/or the location of any enemies or obstacles within the environment.

This step may also comprise the use of an AI character or the like to navigate the environment, with the success of the AI character being indicative of a difficulty. Alternatively, or in addition, this testing may comprise playthrough by one or more human players so as to obtain an indication of the difficulty of the arrangement (or a portion of the arrangement, in the case of a particularly difficult section).

A step 320 comprises associating a difficulty with the arrangement of objects within the environment. The difficulty to be associated with the arrangement may be determined in dependence upon any of the parameters discussed above (or indeed, any other parameters that are identified as relating to the arrangement and/or virtual environment).

A step 330 comprises the determination of a correlation between one or more of the identified parameters and the difficulty of the arrangement.

The method of FIG. 3 may be performed multiple times, such that information about a suitably large number of arrangements of elements is provided for training the model.

The above discussion provides a more general overview of a training method for a machine learning model; in practice, a number of modifications may be made to the process in order to provide an effective and/or efficient training process.

Figure 4:
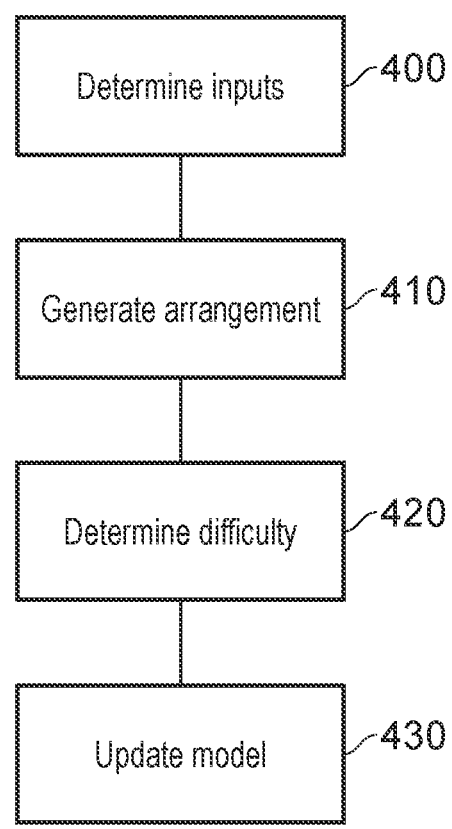
FIG. 4 schematically illustrates a specific training method.

FIG. 4 schematically illustrates a specific training example using a generative adversarial network (GAN) style implementation. In this implementation, a generative model is trained to produce arrangements with a desired difficulty level. In some embodiments a separate generative network is trained to produce arrangements of a each desired difficulty, while in others a single network is used to produce arrangements of any difficulty—in this manner, a single network may be configured to produce easy/medium/difficult arrangements as desired or three networks may be configured to generate arrangements of a respective one of the three difficulties. Of course, the difficulties may be selected on any suitable basis rather than being limited to the three examples mentioned here.

Once the generative network has produced an arrangement, the arrangement is tested by an adversarial model to determine whether the arrangement is of the difficulty that it is intended to be. In some embodiments, this testing may be in the form of an AI-controller character that attempts to navigate the arrangement. Alternatively, or in addition, the adversarial model may comprise a network that has been trained to determine the difficulty of an arrangement based upon one or more existing examples.

At a step 400, one or more inputs are determined for the generative model. For instance, this may include the virtual environment in which the objects are to be arranged, and/or information about an area in which objects are to be arranged (such as a portion of a virtual environment). Further information may also be provided that can further constrain the generation process, such as information about a character that is intended to navigate the arrangement (for instance, a movement speed and/or jumping range). Inputs that characterise the objects to be arranged may also be input as a part of this step.

At a step 410, the generative model generates an arrangement of objects using the trained model. In some embodiments the output may be an arrangement within a virtual environment, while in others the output may be information identifying a location and a number of other properties of objects (that is, information that enables the arrangement of objects to be reproduced). Any suitable format of information may be considered appropriate, so long as the output can be used by the adversarial network to determine a difficulty to be associated with the arrangement.

At a step 420, the output of the generative model in step 410 is provided to the adversarial part of the GAN, which is configured to determine a difficulty of the generated arrangement. The adversarial model is configured to determine whether the generated arrangement is of the difficulty which it purports to be. For instance, if the generative model is configured to generate 'easy' arrangements then the adversarial model can determine whether or not the arrangement that has been output by the generative model does actually fall into this category.

At a step 430, the result of the determination in step 420 is provided to the generative model. In response to this, the generative model can be updated so as to improve the arrangement generation process. For instance, if the arrangement is rejected by the adversarial model then the generative model can be updated so as to avoid generating similar arrangements (that is, arrangements with similar characteristics) in future generative processes.

Of course, any other suitable machine learning techniques may be utilised when performing a training process for generating arrangements of elements within a virtual environment. For example, a reinforcement learning process may be implemented in which a reward is determined for an arrangement in dependence upon the success of a computer- or human-controlled character in navigating that arrangement (in some embodiments, with the reward being dependent upon the skill level of the computer/human to further characterise the difficulty).

In some arrangements it may be considered advantageous to enable feedback to be provided to the training process by a cohort of human players. While this can be implemented during the playtesting process prior to release of content, the amount of feedback can be increased many times over by allowing the machine learning model to be refined based upon the performance of players of the game once it has been released (for instance, as a demo or as a full game). For example, success rates of players with known levels of skill or experience (for instance, based upon a gamer score or number of achievements for one or more games) in navigating particular arrangements can be used to refine the model by providing further feedback about the difficulty of generated arrangements. This feedback can be used to further refine the model such that the generated arrangements have an improved difficulty calibration (that is, the arrangements are more likely to correspond to the desired difficulty).

In some embodiments, it is considered that there may be a range of different elements that are to be arranged (or able to be arranged, as it may not be required that all of the available elements are used). In such embodiments, the size of the elements (and indeed any other characteristic, such as shape) may therefore be considered when generated arrangements. This may be useful as elements of different sizes arranged in the same manner can generate vastly different user experiences—for instance, an arrangement of small platforms is much more challenging (or may even be impossible) for a user to navigate than an equivalent arrangement using larger platforms.

While the above discussion of arrangements of elements has been characterised by the example of platforms as elements, it is considered that embodiments of the present disclosure may be directed instead (or additionally) towards the arrangement of other elements within a virtual environment. For instance, the elements may be walls or barriers that are arranged to provide cover for a player's avatar (for instance, in a shooting game) or to provide a maze for the player to navigate. Similarly, non-player characters may also be placed using such a model—in such a case the model may be trained to generate an arrangement of enemies with a preferred level of difficulty to overcome, or to simulate a realistic distribution of people (NPCs) within an environment. The method of training the machine learning model may be adapted accordingly for each type of element; for example when training a model to generate a realistic distribution of people within an environment, images of populated real-world environments may be provided as an input.

In some embodiments the arrangement of elements may be subject to one or more constraints. These constraints may be applied for design purposes (so as to ensure a particular style is maintained throughout content) or for immersion purposes (so as to ensure that the arrangement is consistent with the rest of the virtual environment), for example. One example of such a constraint is that of gravity, which can be considered to constrain the placement of barriers such that they are not arranged in a physically impossible manner. Further examples of constraints include physical properties of the elements being arranged (and/or one or more other elements within the virtual environment), or over-arching design considerations (such as 'an arrangement having an overall shape of X') which may be informed by stylistic or physical considerations (an example of the latter case being information about how a particular rock fragments, for example, to encourage the generation of a physically accurate representation). Further constraints may also be considered and applied as appropriate—for instance, a number of elements to be arranged, and one or more conditions (such as a minimum distance between elements) may also be considered.

These constraints may be provided as an input to the machine learning model directly, or may be encoded in the physics engine that is used when rendering the virtual environment as appropriate. Alternatively, or in addition, the constraints may be used to generate a tool that checks an arrangement for compliance with the constraints. This can then be used to reject non-compliant arrangements without further testing of the arrangement. Any other suitable method of implementing constraints may also be considered in embodiments of the present disclosure.

In some embodiments, virtual environments may be generated that have a pre-identified region in which elements are to be arranged. These may be determined manually by a developer of the virtual environment, for instance by drawing a boundary box of an area or volume to be populated with an arrangement of elements, or may be determined automatically if it is detected that certain conditions are met. For instance, a condition could be that a gap between areas that are intended to be accessible to a user are a greater-than-threshold distance from one another (rendering an area inaccessible), or that no valid path exists between the entrance and exit of an environment. In addition to information identifying the location of the region, information may be provided that identifies elements that are to be arranged. This information may include a category (such as 'platform' or 'wall'), a style (such as 'stone' or 'wooden'), and/or any other information that can be used to determine the elements that are to be arranged.

Figure 5A:
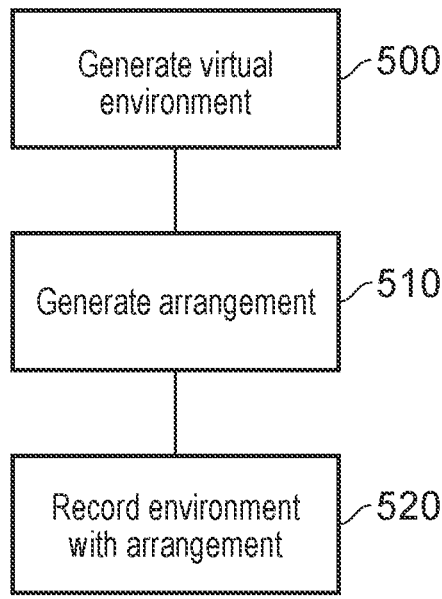
FIGS. 5*a* and 5*b* schematically illustrate examples of the use of a trained machine learning model.
Figure 5B:
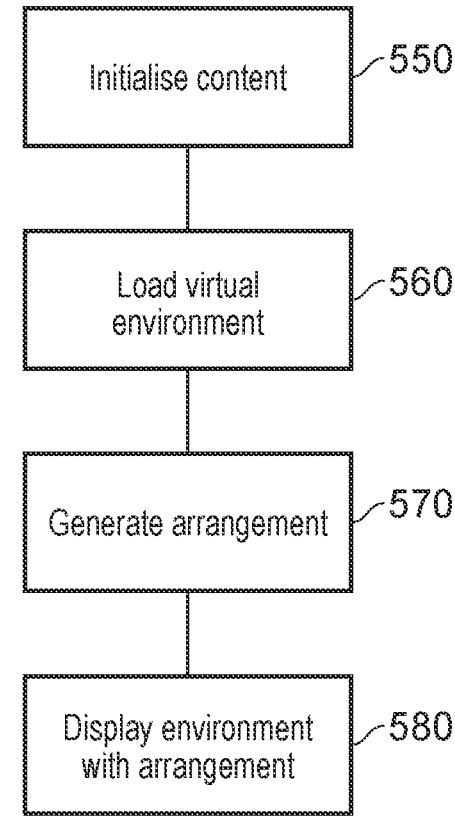

The trained machine learning model may be used to generate an arrangement of elements at any suitable stage of the virtual environment generation process. It is also considered that a single trained model could be utilised multiple times throughout the content so as to generate arrangements of elements for two or more virtual environments. FIGS. 5a and 5b schematically illustrate examples of the use of the trained machine learning model for generating an arrangement of elements within a virtual environment.

Each of these methods, and indeed any other methods of utilising the trained model, may be advantageous in that the variability of the content (between users and/or between playthroughs for a user) is increased without requiring additional input from developers to generate a large number of arrangements by hand. Further to this, the storage requirements for providing such a large number of arrangements can be reduced as the model may be smaller than the number of arrangements (particularly if the model is re-used in multiple virtual environments throughout the content).

FIG. 5a schematically illustrates an example in which the trained model is used during a content creation process, for instance during the development of a video game or other content.

At a step 500 a virtual environment is generated. The virtual environment may be generated in any suitable manner; for instance, the virtual environment may be generated as a part of a video game design process. As noted above, the virtual environment may comprise an indication of one or more portions of the virtual environment that are to be populated with an arrangement of elements—alternatively, or in addition, input may be provided by a developer in an intermediate step so as to indicate one or more portions of the virtual environment that are to be populated.

At a step 510, the machine learning model is used to generate an arrangement of elements within the virtual environment. Inputs to the model may include the virtual environment itself, and/or one or more constraints associated with or derived from the virtual environment (such as a size of the area in which the elements are to be arranged). In some embodiments, the model may be used to generate an input to the virtual environment directly while in others the machine learning model instead generates an output that identifies an arrangement (for example, a list of elements and coordinates for placing them) that can be fed into the virtual environment or a tool for populating the virtual environment.

At a step 520, the virtual environment comprising the generated arrangement is recorded. For example, the virtual environment comprising the generated arrangement of elements may be stored as a new virtual environment that is to be incorporated into the content in which the environment is to be used. In some embodiments, the arrangement may be stored separately to the environment—this may reduce a file size for storing the environment in some embodiments, for instance if the arrangement information can be stored in a particularly efficient manner.

FIG. 5b schematically illustrates an example in which the trained model is provided as a part of the content (such as a video game) and used to generate an arrangement during the playback of the content (for instance, while playing a video game).

At a step 550, the content is initialised. This may comprise launching a video game, for example, or a particular level (or other subset of the game) within the video game that triggers the generation of an arrangement of elements. In some embodiments the generation of an arrangement may be triggered every time the initialisation takes place (such that a new arrangement is generated every time a user plays a game or a particular level), while in others it is only performed in the first instance of the initialisation. In some embodiments, the initialisation of the content may be considered to be the loading of a saved game (or the starting of a new saved game).

At a step 560, a virtual environment is loaded; this may be as a part of the rendering process, or the virtual environment may be loaded pre-emptively such that an arrangement may be generated in advance of the user entering the virtual environment. For example, upon initialisation of a game a virtual environment may be loaded (or at least characterising information for that environment may be retrieved) to enable an arrangement to be generated. In some embodiments, the virtual environment may be loaded as the user enters the virtual environment, with the arrangement of elements being generated and implemented with the user being present in the virtual environment.

At a step 570, the machine learning model is used to generate an arrangement of elements within the virtual environment. This may be in accordance with the discussion of step 510 above, for example.

At a step 580, the virtual environment comprising the arrangement of elements is displayed to one or more users; this step may be performed immediately in some embodiments, while in other embodiments it may be performed when particular conditions are met. For instance, if the arrangement is generated in advance of a user entering a virtual environment then the virtual environment is displayed only when the user navigates to that virtual environment. As an additional or alternative step, the virtual environment comprising the arrangement of elements may be stored for future use.

Any other use of the trained machine learning model may also be considered appropriate, rather than being limited to only the examples discussed above. For example, another method for utilising the machine learning model to generate an arrangement of elements is that of hosting the model at a server and generating a new arrangement of elements to be distributed to users on a regular basis. For instance, a new arrangement could be generated each hour or day (or any other time period), after a predetermined number of plays by users, and/or after a predetermined number of users successfully navigates the arrangement or an associated virtual environment.

While the above description has been provided in the context of determining arrangements of elements with a desired level of difficulty, it is considered that the generation of arrangements of elements may be dependent upon any other characteristics instead (or in addition).

One example of such a characteristic may be an aesthetic consideration. In such a case, the machine learning model may be trained so as to generate arrangements of elements that fit within a particular aesthetic scheme as desired. The training process can be implemented such that the generation of arrangements that fit within the desired scheme are rewarded while those that deviate from the scheme are not. For instance, a scheme may be that the arrangements resemble symbols from a particular group (such as letters, shapes, or numbers)—a discriminator may then be provided that determines whether a generated arrangement has a sufficient degree of similarity with one or more of the symbols in that group. Such considerations may be advantageous in that a consistent style can be provided throughout a piece of content without requiring significant input from a developer.

Another example may be that of distinctiveness as a characteristic. In some embodiments it may be considered advantageous that each arrangement is unique, or does not appear overly similar to other arrangements encountered by the users. In such embodiments the machine learning model may be trained to compare the generated arrangement to an existing library of one or more arrangements so as to determine a similarity score. Any arrangements that exceed a similarity threshold can be discarded, while those which do not may be added to the library.

Figure 6:
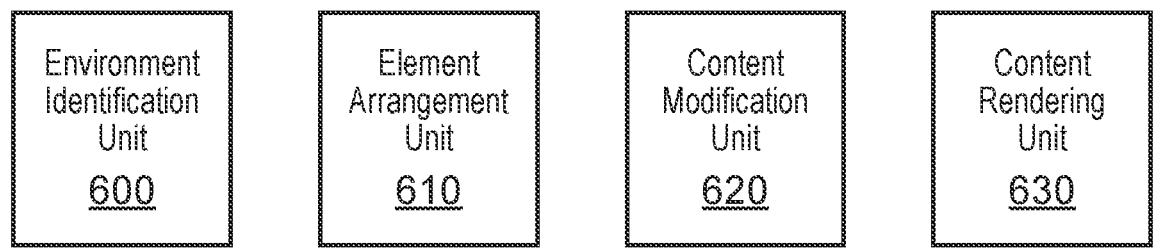
FIG. 6 schematically illustrates a system for generating interactive content.

FIG. 6 schematically illustrates a system for generating interactive content (such as a computer game, or a portion of a game) for a user, the system comprising an environment identification unit 600, an element arrangement unit 610, a content modification unit 620, and a content rendering unit 630. In particular, the system is configured to generate an arrangement of one or more elements within a virtual environment that appears within interactive content. In a number of embodiments the user is able to interact with one or more of the elements within the virtual environment.

The environment identification unit 600 is operable to identify a virtual environment for interaction by a user. This may include the determination of which virtual environment is to be accessed by a user (such as identifying the next chamber a player will enter when playing a game), as well as the determination of one or more characteristics of the virtual environment. Examples of characteristics may include the size of the environment, the type of environment, the location of an area (or volume) in which elements are to be arranged, and/or any other characteristics that indicate one or more properties of the virtual environment of the elements to be arranged.

In some embodiments, the environment identification unit 600 is operable to identify a virtual environment in response to a detection that the user is within a threshold distance from the virtual environment. For example, if the virtual environment is a room in a house then it could be considered that the threshold distance is 'within one room' or 'within three metres of a door leading to the room'.

The element arrangement unit 610 is operable to generate an arrangement of a plurality of elements within the environment in dependence upon one or more parameters. As discussed above, any suitable elements may be considered appropriate—examples include platforms, barriers, walls, and bridges. It is also considered that in some embodiments the elements may represent non-playable characters within the environment, such as AI opponents or NPCs. In some embodiments the element arrangement unit 610 is operable to generate a new arrangement of the elements with each initialisation of the content and/or each identification of the virtual environment in which the arrangement is to be provided.

The parameters upon which the arrangement is dependent may be selected freely in dependence upon the training of the model or the type of element being arranged, for example, rather than being limited to any particular parameters. In some embodiments these parameters may relate to one or more of to a determined difficulty associated with the interactive content, user preferences or performance, and/or characteristics of the virtual environment and/or of the elements to be arranged.

In some embodiments the element arrangement unit 610 is operable to utilise a random component to generate the arrangement such that different arrangements may be generated using the same parameters. This can be implemented as a part of the training process, so as to generate new arrangements, or can be used as an input (similar to a seed value) when generating a new arrangement for an environment. This can ensure that the same arrangement of elements is not generated each time the element arrangement unit 610 is used.

In a number of embodiments, the element arrangement unit 610 is operable to generate arrangements of elements of the same type for each of two or more virtual environments within the content. For example, this may include generating arrangements of the same (or substantially similar, such as differing only in appearance or slightly in size) platforms at multiple locations in a video game. Similarly, this may include generating different arrangements for the same location such that the user does not have the same experience each time they visit the virtual environment.

As has been discussed above, in a number of embodiments the element arrangement unit 610 is operable to utilise a trained machine learning model to generate the arrangement of elements. While not essential, a machine learning model may be a suitable way to ensure that generated arrangements are appropriate for a given virtual environment and one or more other criteria (such as the parameters described above). The machine learning model may be trained using gameplay data from one or more players, for example, and one or more metrics associated with success within that gameplay data. Suitable metrics may include successful navigation of a virtual environment or completion of a level containing a virtual environment, for instance.

The content modification unit 620 is operable to modify the virtual environment so as to include the plurality of elements in the generated arrangement. This may be performed during a content creation process, such that a virtual environment is output that already comprises the arrangement. Alternatively, or in addition, the virtual environment may be modified at the time of rendering (or at least after the content creation process, such as during a reproduction process such as during gameplay) such that an existing virtual environment is enhanced with the addition of the arrangement of elements.

The content rendering unit 630 is operable to render one or more images of the modified virtual environment. Such a unit is optional in a number of embodiments, as the modified virtual environment may instead be stored for later use. Such an alternative may be appropriate in the case that the arrangement is generated during the content creation process, or if the arrangement is generated for an environment upon launching a game (or a new save file, or at the start of a level which the user returns to at a later time) for instance.

The system of FIG. 6 may be provided as a single unit in some embodiments, such as a single computer, or the units may be distributed such that processing tasks are performed by two or more computing devices or servers. For instance, an environment identification may be performed by a content creation device, with the content reproduction device (such as a games console) performing the remaining processing. Similarly, the element arrangement unit may be located at a server with the arrangement being accessible by a user of a content reproduction device via a network connection or the internet.

The arrangement of FIG. 6 is an example of a processor (for example, a GPU and/or CPU located in a games console or any other computing device) that is operable to generate interactive content for a user, and in particular is operable to:
- identify a virtual environment for interaction by a user;
- generate an arrangement of a plurality of elements within the environment in dependence upon one or more parameters;
- modify the virtual environment so as to include the plurality of elements in the generated arrangement; and optionally
- render one or more images of the modified virtual environment.

Figure 7:
FIG. 7 schematically illustrates a system for performing a training process.

FIG. 7 schematically illustrates a system for performing a training process for an element arrangement machine learning model. The system comprises an input unit 700, a training unit 710, and a model generation unit 720. Such a system is entirely exemplary, as the training method (and therefore arrangement for performing the training) varies in dependence upon the type of model that is selected and the input/output parameters.

The input unit 700 is operable to receive one or more inputs that constrain the training process. This may include one or more of information characterising a virtual environment, a virtual environment, one or more character parameters (such as player character abilities), information characterising the elements to be arranged, information characterising desired arrangements, and/or parameters defining the goal of the machine learning model (such as a target difficulty for the arrangement).

The training unit 710 is operable to perform a machine learning process so as to train a model that is operable to generate one or more arrangements of elements. This training may be performed in accordance with one or more of the methods described above, although it is considered that a number of alternative training methods may be appropriate.

The model generation unit 720 is operable to generate a model for output that is configured to generate one or more arrangements of elements in accordance with embodiments of the present disclosure. The generated model may be used as a part of a content creation process (such as by a developer of a video game), or it may be distributed (in some cases, alongside content such as a video game) to be used by and end-user or intermediate device. Examples of such use are described above.

Figure 8:
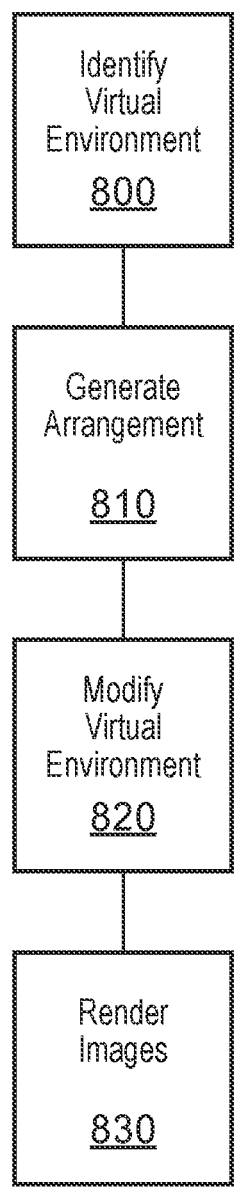
FIG. 8 schematically illustrates a method for generating interactive content.

FIG. 8 schematically illustrates a method for generating interactive content for a user.

A step 800 comprises identifying a virtual environment for interaction by a user.

A step 810 comprises generating an arrangement of a plurality of elements within the environment in dependence upon one or more parameters.

A step 820 comprises modifying the virtual environment so as to include the plurality of elements in the generated arrangement.

A step 830 comprises rendering one or more images of the modified virtual environment.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the invention may be implemented in accordance with any of the following numbered clauses:

1. A system for generating interactive content for a user, the system comprising:
    - an environment identification unit operable to identify a virtual environment for interaction by a user;
    - an element arrangement unit operable to generate an arrangement of a plurality of elements within the environment in dependence upon one or more parameters;
    - a content modification unit operable to modify the virtual environment so as to include the plurality of elements in the generated arrangement; and
    - a content rendering unit operable to render one or more images of the modified virtual environment.

2. A system according to clause 1, wherein:
    - the element arrangement unit is operable to generate a new arrangement of the elements with each initialisation of the content and/or each identification of the virtual environment; and
    - the content modification unit is operable to modify the virtual environment so as to implement the new arrangement of elements in response to the generation of the new arrangement.

3. A system according to any preceding clause, wherein the environment identification unit is operable to identify a virtual environment in response to a detection that the user is within a threshold distance from the virtual environment.

4. A system according to any preceding clause, wherein one or more of the parameters relate to a determined difficulty associated with the interactive content.

5. A system according to any preceding clause, wherein one or more of the parameters relate to user preferences or performance.

6. A system according to any preceding clause, wherein one or more of the parameters relate to characteristics of the virtual environment and/or of the elements to be arranged.

7. A system according to any preceding clause, wherein one or more of the elements represent non-playable characters within the environment.

8. A system according to any preceding clause, wherein the element arrangement unit is operable to utilise a random component to generate the arrangement such that different arrangements may be generated using the same parameters.

9. A system according to any preceding clause, wherein the element arrangement unit is operable to generate arrangements of elements of the same type for each of two or more virtual environments within the content.

10. A system according to any preceding clause, wherein the user is able to interact with one or more of the elements within the virtual environment.

11. A system according to any preceding clause, wherein the element arrangement unit is operable to utilise a trained machine learning model to generate the arrangement.

12. A system according to clause 11, wherein the machine learning model is trained using gameplay data from one or more players and one or more metrics associated with success within that gameplay data.

13. A method for generating interactive content for a user, the method comprising:
identifying a virtual environment for interaction by a user;
generating an arrangement of a plurality of elements within the environment in dependence upon one or more parameters;
modifying the virtual environment so as to include the plurality of elements in the generated arrangement; and
rendering one or more images of the modified virtual environment.

14. Computer software which, when executed by a computer, causes the computer to carry out the method of clause 13.

15. A non-transitory machine-readable storage medium which stores computer software according to clause 14.

The invention claimed is:

1. A system for generating interactive content for a user, the system comprising:
an environment identification unit operable to identify a virtual environment for interaction by a user;
an element arrangement unit operable to generate an arrangement of a plurality of elements within the environment in dependence upon one or more parameters, where each element of the plurality of elements represents an object or an artificial intelligence character;
a content modification unit operable to modify the virtual environment so as to include the plurality of elements in the generated arrangement; and
a content rendering unit operable to render one or more images of the modified virtual environment,
wherein one or more of the parameters relate to a determined difficulty associated with the interactive content.

2. The system of claim 1, wherein:
the element arrangement unit is operable to generate a new arrangement of one or more of the elements of the plurality of elements with each initialisation of the content and/or each identification of the virtual environment; and
the content modification unit is operable to modify the virtual environment so as to implement the new arrangement of one or more of the elements of the plurality of elements in response to the generation of the new arrangement.

3. The system of claim 1, wherein the environment identification unit is operable to identify a virtual environment in response to a detection that the user is within a threshold distance from the virtual environment.

4. The system of claim 1, wherein one or more of the parameters relate to user preferences or performance.

5. The system of claim 1, wherein one or more of the parameters relate to characteristics of the virtual environment and/or of one or more of the elements of the plurality of elements to be arranged.

6. The system of claim 1, wherein one or more of the elements of the plurality of elements represent non-playable characters within the environment.

7. The system of claim 1, wherein the element arrangement unit is operable to utilise a random component to generate the arrangement such that different arrangements may be generated using the same parameters.

8. The system of claim 1, wherein the element arrangement unit is operable to generate arrangements of elements of the same type for each of two or more virtual environments within the content.

9. The system of claim 1, wherein the user is able to interact with one or more of the elements of the plurality of elements within the virtual environment.

10. The system of claim 1, wherein the element arrangement unit is operable to utilise a trained machine learning model to generate the arrangement.

11. The system of claim 10, wherein the machine learning model is trained using gameplay data from one or more players and one or more metrics associated with success within that gameplay data.

12. A method for generating interactive content for a user, the method comprising:
identifying a virtual environment for interaction by a user;
generating an arrangement of a plurality of elements within the environment in dependence upon one or more parameters, where each element of the plurality of elements represents an object or an artificial intelligence character;
modifying the virtual environment so as to include the plurality of elements in the generated arrangement; and
rendering one or more images of the modified virtual environment,
wherein one or more of the parameters relate to a determined difficulty associated with the interactive content.

13. A non-transitory machine-readable storage medium which stores computer software which, when executed by a computer, causes the computer to perform a method for generating interactive content for a user, the method comprising:
identifying a virtual environment for interaction by a user;
generating an arrangement of a plurality of elements within the environment in dependence upon one or more parameters, where each element of the plurality of elements represents an object or an artificial intelligence character;
modifying the virtual environment so as to include the plurality of elements in the generated arrangement; and
rendering one or more images of the modified virtual environment,
wherein one or more of the parameters relate to a determined difficulty associated with the interactive content.

* * * * *